(12) United States Patent
Inaoka et al.

(10) Patent No.: US 8,870,226 B2
(45) Date of Patent: *Oct. 28, 2014

(54) EVAPORATED FUEL CONTROL DEVICE FOR SADDLE-TYPE VEHICLES

(75) Inventors: Hiroshi Inaoka, Kumagaya (JP); Kazuo Fujihara, Saitama (JP); Toshinao Takigawa, Niiza (JP); Takeo Igari, Niiza (JP); Shuji Hirayama, Asaka (JP); Minehiro Matsuoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 149 days.

This patent is subject to a terminal disclaimer.

(21) Appl. No.: 13/580,589

(22) PCT Filed: Feb. 22, 2010

(86) PCT No.: PCT/JP2010/001146
§ 371 (c)(1),
(2), (4) Date: Aug. 22, 2012

(87) PCT Pub. No.: WO2011/101920
PCT Pub. Date: Aug. 25, 2011

(65) Prior Publication Data
US 2012/0312619 A1 Dec. 13, 2012

(51) Int. Cl.
| | |
|---|---|
| B60P 3/22 | (2006.01) |
| B62J 37/00 | (2006.01) |
| B62J 31/00 | (2006.01) |
| B60K 15/01 | (2006.01) |
| B60K 15/035 | (2006.01) |
| B60K 15/03 | (2006.01) |
| B60K 15/063 | (2006.01) |

(52) U.S. Cl.
CPC ............. *B62J 37/00* (2013.01); *B62K 2202/00* (2013.01); *B62J 31/00* (2013.01); *B60K 2015/03256* (2013.01); *B60Y 2200/12* (2013.01); *B60K 15/01* (2013.01); *B60K 15/03519* (2013.01); *B60Y 2200/126* (2013.01); *B60K 2015/0632* (2013.01)
USPC ........................................................ 280/833

(58) Field of Classification Search
CPC ........................................................ B62J 35/00
USPC ........................................................ 280/833
See application file for complete search history.

(56) References Cited

U.S. PATENT DOCUMENTS 8,561,745 B2 * 10/2013 Inaoka et al. .................. 180/219
2012/0240902 A1 * 9/2012 Kondo et al. .................. 123/518

(Continued)

FOREIGN PATENT DOCUMENTS

| JP | 55-164578 A | 12/1980 |
|---|---|---|
| JP | 49-88172 | 11/1981 |

(Continued)

*Primary Examiner* — Joseph M Rocca
*Assistant Examiner* — Conan Duda
(74) *Attorney, Agent, or Firm* — Birch, Stewart, Kolasch & Birch, LLP

(57) ABSTRACT

There is provided an evaporated fuel control device for a saddle-type vehicle in which an air supply passage is laid out without being disposed at a higher position than a fuel tank. The fuel tank 12 is disposed at a higher position than the engine 20, an evaporated fuel passage 110 is routed as a descending passage from the fuel tank 12 to the engine 20, and an air supply passage 120 is jointed to a halfway position of the evaporated fuel passage 110 which is located at a fuel tank 12 side with respect to a first check valve 117 and positionally lower than the uppermost portion of the fuel tank 12.

20 Claims, 7 Drawing Sheets

(56) References Cited

U.S. PATENT DOCUMENTS

| | | | |
|---|---|---|---|
| 2012/0240905 A1* | 9/2012 | Kondo et al. | 123/519 |
| 2012/0240906 A1* | 9/2012 | Shimura et al. | 123/521 |
| 2012/0314435 A1* | 12/2012 | Hoashi et al. | 362/476 |
| 2013/0240281 A1* | 9/2013 | Inaoka et al. | 180/219 |
| 2013/0247881 A1* | 9/2013 | Okubo et al. | 123/519 |

FOREIGN PATENT DOCUMENTS

| | | |
|---|---|---|
| JP | 10-324281 A | 12/1998 |
| JP | 2005-061305 A | 3/2005 |

\* cited by examiner

EVAPORATED FUEL CONTROL DEVICE FOR SADDLE-TYPE VEHICLES

TECHNICAL FIELD

The present invention relates to an evaporated fuel control device for saddle-type vehicles.

BACKGROUND ART

A two-wheeled motor vehicle that is provided with a canister for temporarily adsorbing evaporated fuel in a fuel tank and supplies the fuel to an engine intake system from the canister is disclosed (see Patent Document 1, for example). When a canister is disposed in a saddle-type vehicle such a two-wheeled motor vehicle or the like, the design of the vehicle body is restricted and also the vehicle body grows in size in order to secure the configuration space of the canister.

A method of introducing evaporated fuel in a fuel tank to a crank chamber after the evaporated fuel is made to pass through oil in an oil pan of the crank chamber and then supplying the evaporated fuel to an engine intake system together with blow-by gas when an engine is driven is disclosed as a method using no canister (see Patent Document 2, for example).

PRIOR ART DOCUMENTS

Patent Document

Patent Document 1: JP-A-10-324281
Patent Document 2: JP-UM-A-49-88172

SUMMARY OF THE INVENTION

Problem to be Solved by the Invention

However, it is required in the construction of the cited document 2 to provide an evaporated fuel passage for making evaporated air flow therethrough and an air supply passage for supplying outdoor air into a fuel tank. Therefore, when the method of the cited document 2 is applied to a saddle-type vehicle, various problems occur in adaptation of this method to the existing part arrangement and usability of the saddle-type vehicle.

For example, there is considered a layout in which the air supply passage is opened to the atmosphere at the upper side of the fuel tank. However, with respect to a saddle-type vehicle in which a fuel tank is disposed above an engine, a seat is disposed above the fuel tank or the fuel tank itself is disposed at the uppermost portion of the vehicle, so that it is difficult to secure a layout space above the tank. Therefore, when the space is set above the tank, it would cause such a problem that the seat is located at a high position. Since the layout space itself is originally small in the saddle-type vehicle, it has been desired to design the evaporated fuel passage and the air supply passage in compact size.

The present invention has been implemented in view of the foregoing situation, and has an object to provide an evaporated fuel control device for a saddle-type vehicle that enables an air supply passage to be laid out in the saddle-type vehicle without being disposed at a higher position than a fuel tank.

Means of Solving the Problem

In order to attain the above object, an evaporated fuel control device for a saddle-type vehicle having an engine, a fuel tank for stocking fuel, an evaporated fuel passage that is connected to the fuel tank at one end thereof and connected to oil in the engine at the other end thereof, a first check valve that is provided at a halfway position of the evaporated fuel passage and stops flow from the engine to the fuel tank, an air supply passage for supplying outdoor air into the fuel tank, and a second check valve that is provided at some halfway position of the air supply passage and stops flow from the fuel tank to the atmosphere, is characterized in that the fuel tank is disposed at an upper side of the engine, the evaporated fuel passage is routed as a descending path from the fuel tank to the engine, the air supply passage is joined to a halfway position of the evaporated fuel passage that is located at a fuel tank side with respect to the first check valve and positionally lower than the uppermost portion of the fuel tank.

According to this construction, the fuel tank is disposed at a higher position than the engine, the evaporated fuel passage is routed as a descending passage from the fuel tank to the engine, and the air supply passage 120 is jointed to a halfway position of the evaporated fuel passage which is located at the fuel tank side with respect to the first check valve and positionally lower than the uppermost portion of the fuel tank. Therefore, the air supply passage can be laid out in the saddle-type vehicle without being disposed at a higher position than the fuel tank.

In the above construction, the saddle-type vehicle may have a head pipe for supporting a front wheel so that the front wheel is steerable, and a main frame extending rearwards and downwards from the head pipe, the engine may be disposed at a lower side of the main frame, the fuel tank may be disposed at an upper side of a rear frame extending rearwards and upwards from a rear portion of the main frame, and the evaporated fuel passage may protrude rearwards from the fuel tank and may be further disposed along the rear frame and connected to the engine. According to this construction, the evaporated fuel passage may be routed by using the rear frame.

In the above construction, a pair of right and left rear frames may be provided, the evaporated fuel passage may be disposed along one rear frame of the pair of right and left rear frames, and a fuel supply passage for supplying fuel from the fuel tank to an intake system of the engine may be disposed along the other rear frame. According to this construction, the fuel supply passage and the evaporated fuel passage may be allocated to and disposed at the right and left sides, so that they can be easily assembled.

Furthermore, in the above construction, the rear frame may be provided with a tank support bracket that extends upwards from the rear frame and supports the fuel tank, the air supply passage may extend upwards along the tank support bracket, and a part of the air supply passage may be supported by the tank support bracket or the fuel tank. According to this construction, the air supply passage can be supported by using an existing part, and increase of the number of parts can be avoided.

In the above construction, the second check valve may be disposed between the tank support bracket and the fuel tank, and a portion of the air supply passage that is located at an open end side thereof with respect to the second check valve may be supported by the fuel tank. According to this construction, the second check valve can be disposed by using the dead space between the tank support bracket and the fuel tank, and the open end of the air supply passage can be surely positioned by the fuel tank.

Still furthermore, in the above construction, the fuel tank may be disposed at a substantially middle position between the front wheel and a rear wheel in a vehicle travel direction.

According to this construction, the fuel tank and the open end of the air supply passage can be disposed at positions which are far away from the front and rear wheels at which dust is easily raised, and also relatively distant from the ground surface.

In the above construction, the saddle-type vehicle may be equipped with a seat on which a driver sits, and the seat may be disposed so as to cover an upper surface of the fuel tank. According to this construction, in the evaporated fuel control device, the air supply passage can be laid out without being disposed at a higher position than the fuel tank. Therefore, even in the arrangement that the seat covers the upper surface of the fuel tank, the seat can be set at a low position as in the case of a vehicle having no evaporated fuel control device.

Furthermore, in the above construction, the first check valve may be disposed to be positionally overlapped with the engine in top view. According to this construction, when oil from the engine exists in the first check valve, the fluidity of the oil is increased by heat ascending from the engine to enable the oil from easily return to the engine side. When liquid fuel exists in the first check valve, the liquid fuel can be positively evaporated by the heat of the engine.

Effect of the Invention

According to the present invention, the fuel tank is disposed at a higher position than the engine, the evaporated fuel passage is routed as a descending passage from the fuel tank to the engine, and the air supply passage 120 is jointed to a halfway position of the evaporated fuel passage which is located at the fuel tank side with respect to the first check valve and positionally lower than the uppermost portion of the fuel tank. Therefore, the air supply passage can be laid out in the saddle-type vehicle without being disposed at a higher position than the fuel tank.

Furthermore, the saddle-type vehicle has a head pipe for supporting a front wheel so that the front wheel is steerable, and a main frame extending rearwards and downwards from the head pipe, the engine is disposed at a lower side of the main frame, the fuel tank is disposed at an upper side of a rear frame extending rearwards and upwards from a rear portion of the main frame, and the evaporated fuel passage protrudes rearwards from the fuel tank and may be further disposed along the rear frame and connected to the engine, whereby the evaporated fuel passage can be routed by using the rear frame.

Furthermore, a pair of right and left rear frames is provided, the evaporated fuel passage is disposed along one rear frame of the pair of right and left rear frames, and a fuel supply passage for supplying fuel form the fuel tank to an intake system of the engine is disposed along the other rear frame, whereby the fuel supply passage and the evaporated fuel passage can be allocated to and disposed at the right and left sides, so that they can be easily assembled.

Furthermore, the rear frame is provided with a tank support bracket that extends upwards from the rear frame and supports the fuel tank, the air supply passage extends upwards along the tank support bracket, and a part of the air supply passage is supported by the tank support bracket or the fuel tank, whereby the air supply passage can be supported by using an existing part, and increase of the number of parts can be avoided.

The second check valve is disposed between the tank support bracket and the fuel tank, and a portion of the air supply passage that is located at an open end side thereof with respect to the second check valve is supported by the fuel tank, whereby the second check valve can be disposed by using the dead space between the tank support bracket and the fuel tank, and the open end of the air supply passage can be surely positioned by the fuel tank.

Furthermore, the fuel tank is disposed at a substantially middle position between the front wheel and a rear wheel in a vehicle travel direction, whereby the fuel tank and the open end of the air supply passage can be disposed at positions which are far away from the front and rear wheels at which dust is easily raised, and also relatively distant from the ground surface.

Furthermore, the seat on which a driver sits is disposed so as to cover an upper surface of the fuel tank, whereby the evaporated fuel control device can be laid out without disposing the air supply passage at a higher position than the fuel tank. Therefore, even in the arrangement that the seat covers the upper surface of the fuel tank, the seat can be set at a low position as in the case of a vehicle having no evaporated fuel control device.

Furthermore, the first check valve is disposed to be positionally overlapped with the engine in top view, whereby when oil from the engine exists in the first check valve, the fluidity of the oil is increased by heat ascending from the engine to enable the oil from easily return to the engine side, and when liquid fuel exists in the first check valve, the liquid fuel can be positively evaporated by the heat of the engine.

MODE FOR CARRYING OUT THE INVENTION

An embodiment according to the present invention will be hereunder described with reference to the drawings. In the following description, the front-and-rear, right-and-left and up-and-down directions are defined as directions based on ca view from a rider of the vehicle.

Figure 1:
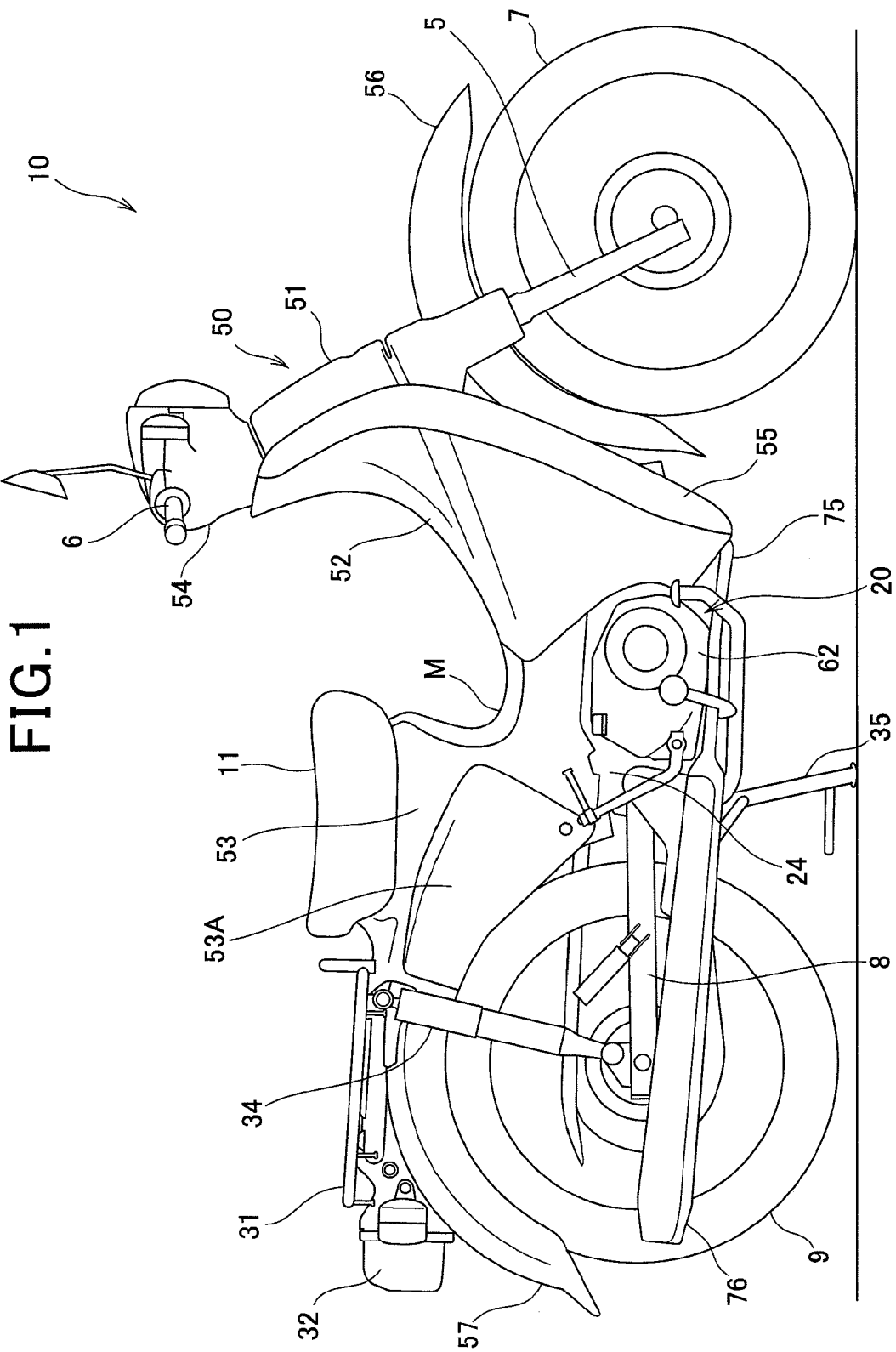
FIG. 1 is a right side view of a two-wheeled motor vehicle equipped with an evaporated fuel control device according to an embodiment of the present invention.
Figure 2:
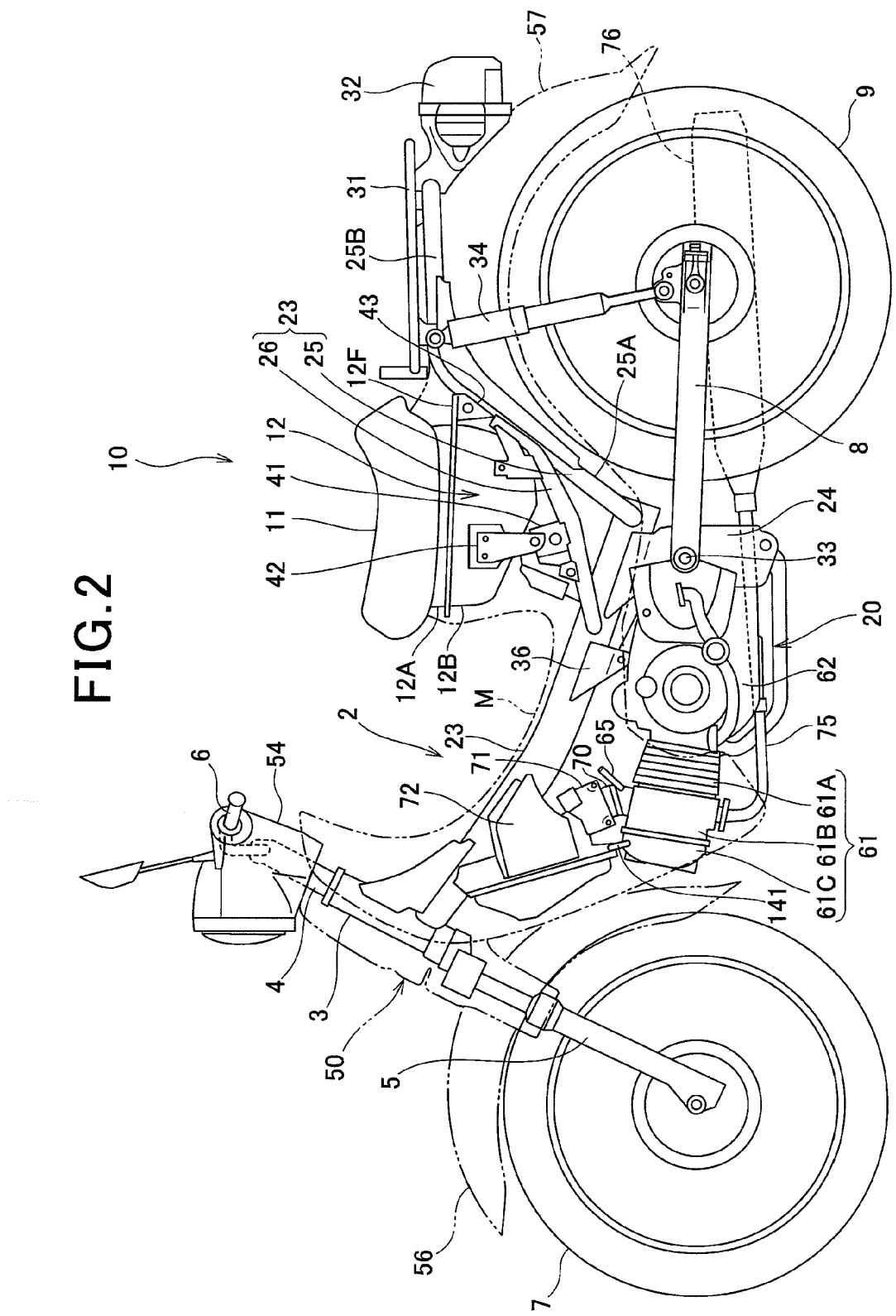
FIG. 2 is a diagram showing an internal construction of the two-wheeled motor vehicle.

FIG. 1 is a right side view of a two-wheeled motor vehicle in which an evaporated fuel control device according to an embodiment of the present invention is mounted, and FIG. 2 is a diagram showing the internal construction of the two-wheeled motor vehicle.

As shown in FIGS. 1 and 2, the two-wheeled motor vehicle 10 is a saddle-type vehicle in which a fuel tank 12 is disposed below a seat 11 on which a rider (driver) sits, and it has a foot straddle portion M which is U-shaped in side view and disposed ahead of the seat 11 and a fuel tank 12, and an engine (also called as a power unit) 20 as an internal combustion engine which is disposed below the foot straddle portion M and the fuel tank 12.

This two-wheeled motor vehicle 10 has a vehicle body frame 2, a steering stem which is freely turnably supported on a head pipe 3 of the vehicle body frame 2 and constitutes a part of a steering system, a pair of right and left front forks 5 joined to the lower portion of the steering stem 4, a steering handle 6 joined to the upper end of the steering stem 4, a front wheel 7 which is freely rotatably supported on the front forks 5, swing arms 8 which is supported at the rear portion of the vehicle body frame 2 so as to be freely swingable in the up-and-down direction, a rear wheel 9 which is freely rotatably supported at the rear ends of the swing arms 8, and an engine 20 supported at the lower portion of the intermediate position in the front-and-rear direction of the vehicle body frame 2 (between the front wheel 7 and the rear wheel 9).

Figure 3:
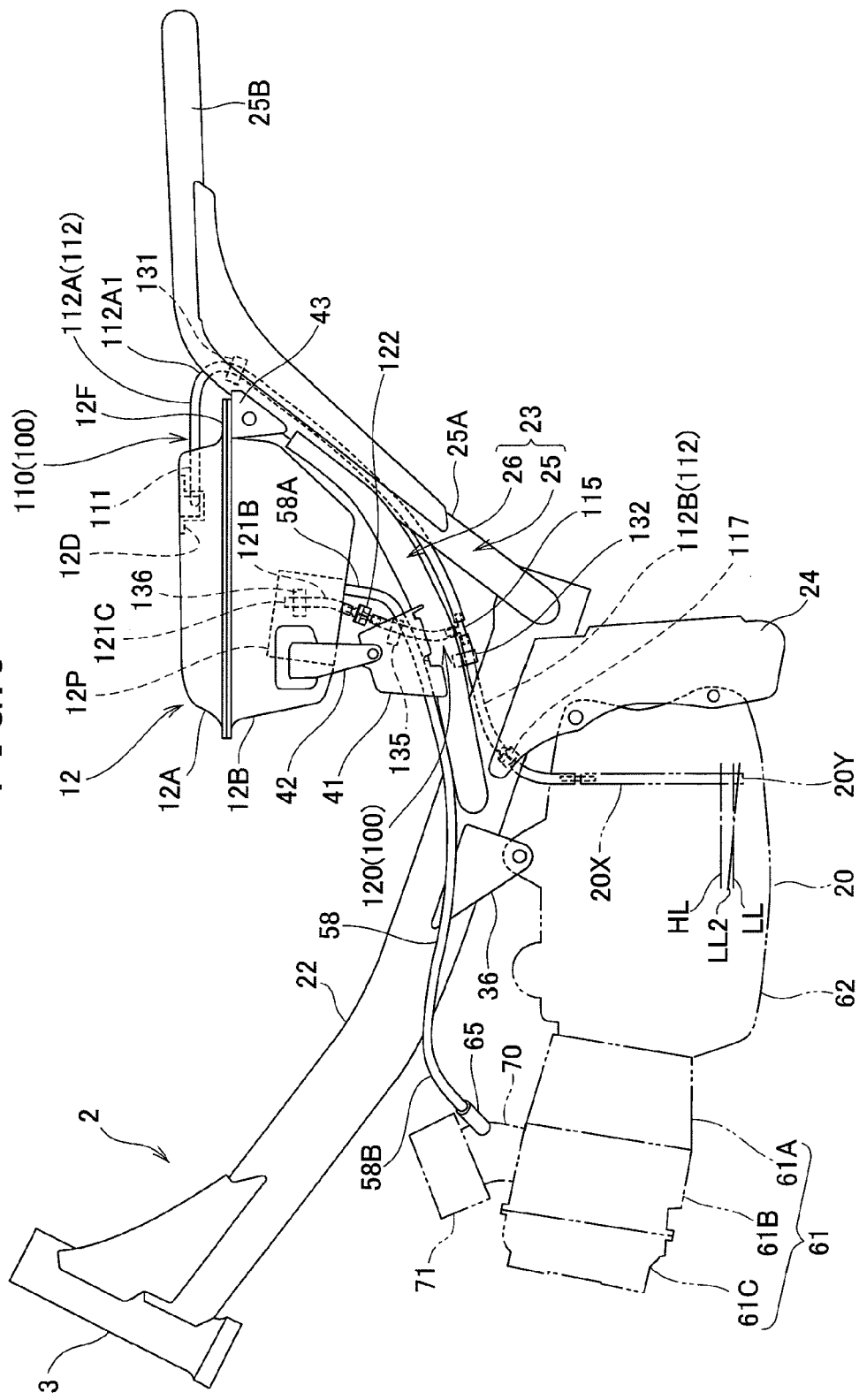
FIG. 3 is a diagram showing a vehicle body frame together with a peripheral construction thereof.

FIG. 3 shows the vehicle body frame 2 together with the peripheral construction thereof.

The vehicle body frame 2 has a single main frame 22 extending rearwards and downwards from the head pipe 3 provided at the front end, a pair of right and left rear frames 23 which extend rearwards and upwards from the rear portion of the main frame 22, and a pair of right and left pivot plates 24 which extend downwards from the rear portion of the main frame 22. The main frame 22 and the rear frames 23 are formed of metal pipes.

The rear frames 23 have pairs of right and left first and second rear frames 25 and 26 which extend from the rear portion of the main frame 22 rearwards and upwards. The first rear frame 25 has a slope portion 25A extending from the rear end of the main frame 22 rearwards and upwards, and a horizontal portion 25B which horizontally extends rearwards from the rear end of the slope portion 25A, the slope portion 25A and the horizontal portion 25B being provided integrally with each other, and a carrier 31 and a tail lamp 32 (see FIG. 2) are supported by the horizontal portions 25B.

The second rear frame 26 extends from the main frame 22 rearwards and upwards at the front and upper side of the first rear frame 25, and the rear end thereof is joined to the slope portion 25A of the first rear frame 25.

As described above, the rear frame 23 is constructed by the first rear frame 25 and the second rear frame 26, and thus the rigidity of the rear frame 23 itself can be sufficiently secured. Furthermore, since the second rear frame 26 bridges the main frame 22 and the first rear frame 25, it functions as a reinforcing frame for reinforcing the joint rigidity of the main frame 22 and the first rear frame 25, so that the rigidity of the rear frame 23 can be efficiently enhanced.

The pair of right and left second rear frames 26 are provided with a pair of right and left tank support brackets 41 projecting upwards, and the fuel tank 12 is supported at the upper side of the rear frames 23 through the tank support brackets 41. The seat 11 is supported at the upper side of the fuel tank 12 so as to be freely openable and closable, and the seat 11 also serves as a lid for covering the upper side of the fuel tank 12.

Here, in FIG. 2, reference numeral 42 represents a pair of right and left downwards extending stays extending downwards from the right and left side walls of the fuel tank 12, and the lower ends of the pair of right and left downwards extending stays 42 are fastened to the tank support brackets 41 by bolts, whereby the fuel tank 12 is supported at the upper side of the rear frames 23.

The rear frames 23 are provided with a pair of right and left tank rear side support brackets 43 for supporting the rear portion of the fuel tank 12. The tank rear side support brackets 43 are provided at the upper portions of the slope portions 25A of the first rear frames 25, and a flange portion 12F which is integrally provided to the fuel tank 12 is fastened and fixed to the tank rear side support brackets 43 by bolts.

Accordingly, the fuel tank 12 is fixed to the second rear frames 26 at the front right and left sides thereof, and fixed to the first rear frames 25 at the rear right and left sides thereof, whereby the fuel tank 12 is supported with sufficient support strength by both the frames 25 and 26.

As shown in FIG. 2, the swing arms 8 are pivotally supported through a pivot shaft 33 on the right and left pivot plates 24 so as to be freely swingable, and a pair of right and left rear cushions 34 are interposed between the rear portions of the swing arms 8 and the horizontal portions 25B of the first rear frames 25.

Furthermore, a main stand 35 (see FIG. 1) is secured to the pivot plates 24 so that the vehicle body is parked in a vertical position on the ground surface. FIG. 1 shows a state that the main stand 35 is put down to a parking position, and the main stand 35 is designed like a lickstand which stands to be tilted forwards and downwards at the parking position. As shown in FIG. 1, the rear wheel 9 is lifted up by setting the main stand 35.

The upper portion of the engine 20 is suspended from a support bracket 36 which is vertically provided to the center portion of the main frame 22, and the rear portion of the engine 20 is fixed to the upper and lower portions of the pivot plates 24, whereby the engine 20 is supported below the main frame 22 and ahead of the pivot plates 24.

As shown in FIGS. 1 and 2, the two-wheeled motor vehicle 10 has a vehicle body cover 50 formed of synthetic resin with which the substantially whole vehicle body is covered. The vehicle body cover 50 has a front cover 51 covering the front portion of the vehicle body (head pipe 3, etc.), a main frame cover 52 which is connected to the front cover 51 from the rear side of the head pipe 3 so as to pinch the head pipe 3 and covers the main frame 22 partway, a rear side cover 53 which is connected to the rear edge of the main frame cover 52 and covers the periphery of the fuel tank 12, and a handle cover 54 which covers the center portion in the right-and-left direction of the handle 6.

The main frame cover 52 covers the main frame 22 from the upper side thereof over the right and left sides thereof to both the sides of a cylinder portion 61 of the engine 20 and the upper edge of a crank case 62 of the engine 20. Furthermore, a pair of right and left leg shields 55 covering the front side of the rider's feet are formed integrally with the main frame cover 52.

The rear side cover 53 is provided with freely detachable lids 53A, and parts inside the rear side cover 53 can be accessed by detaching the lids 53A.

Reference numeral 56 represents a front fender which is secured to the front fork 5 and covers the front wheel 7 from the upper side, and reference numeral 57 represents a rear fender which is secured to the rear frames 23 and covers the rear wheel 9 from the upper side.

Next, the engine 20 and the surrounding construction thereof will be described.

The engine 20 is a single cylinder type four-cycle air-cooled engine, and it is a horizontal engine in which the cylinder portion 61 protrudes substantially horizontally from the front portion of the crank case 62 to the front side thereof as shown in FIG. 2. By adopting the horizontal engine, the vehicle body can be designed so that the center of gravity thereof is low, and the foot straddle portion M can be set at a low position by positionally lowering the main frame 22, so that the getting-on-and-off performance can be enhanced.

The cylinder portion 61 is constructed by a cylinder block 61A joined to the front portion of the crank case 62, a cylinder head 61B joined to the front portion of the cylinder block 61A and a head cover 61C joined to the front portion of the cylinder head 61B.

An intake pipe 70, a throttle body (fuel supply device) 71 and an air cleaner unit 72 are successively pipe-connected to the upper surface of the cylinder head 61B as the upper front portion of the engine 20, and these parts constitute an engine intake system. This engine intake system is disposed between the engine 20 and the main frame 22 and inside the main frame cover 52, that is, the engine intake system is laid out in a space above the engine 20. An injector 65 for supplying fuel to the engine intake system is secured to the intake pipe 70.

Furthermore, a single exhaust pipe 75 is connected to the lower surface of the cylinder head 61B. The exhaust pipe 75 extends downwardly, bends and extends rearwards and then is connected to a muffler 76 disposed at the right side of the rear wheel 9. That is, an engine exhaust system is constructed by the exhaust pipe 75 and the muffler 76, and the engine exhaust system is laid out in a space below the engine 20 and at a side of the rear wheel 9.

Here, a fuel supply passage (so-called fuel hose) 58 for supplying fuel in the fuel tank 12 to the engine intake system is disposed along the rear frame 23 at the left side of the vehicle body as shown in FIG. 3.

Describing specifically, the fuel supply passage 58 is a flexible pipe having flexibility such as a rubber hose or the like, and it is formed of a pipe through which fuel is not permeable. One end 58A of the fuel supply passage 58 is connected to a fuel exit portion provided to the bottom wall of the fuel tank 12, and the fuel supply passage 58 extends from the fuel exit portion to one side in the vehicle width direction (the left side of the vehicle body in this embodiment), and further extends obliquely downwardly along the upper surface of the second rear frame 26 at the one side in the vehicle width direction. The other end 58B of the fuel supply passage 58 is connected to the engine intake system (the injector 65 secured to the intake pipe 70 in this embodiment).

The two-wheeled motor vehicle 10 is designed as a fuel injection type in which a fuel pump 12P is disposed in the fuel tank 12 and fuel pressurized by the fuel pump 12P is supplied to the engine 20 through the fuel supply passage 58 and the injector 65, however, it may not be designed as the fuel injection type. Even when the two-wheeled motor vehicle 10 is not designed as the fuel injection type, the layout of the fuel supply passage is identical, and the connection destination of the fuel supply passage may be set not to the injector 65, but to a carburetor (fuel supply device).

When this two-wheeled motor vehicle 10 is provided with an evaporated fuel control device 100 for preventing evaporated fuel occurring in the fuel tank 12 from being discharged to the atmosphere, it is difficult to secure a layout space of the evaporated fuel control device 100 above the fuel tank 12 because this two-wheeled motor vehicle 10 has a vehicle layout in which the fuel tank 12 is located at the upper side of the engine 20 and the seat 11 is located above the fuel tank 12.

Therefore, the evaporated fuel control device 100 is mounted in this vehicle as described below.

Figure 4:
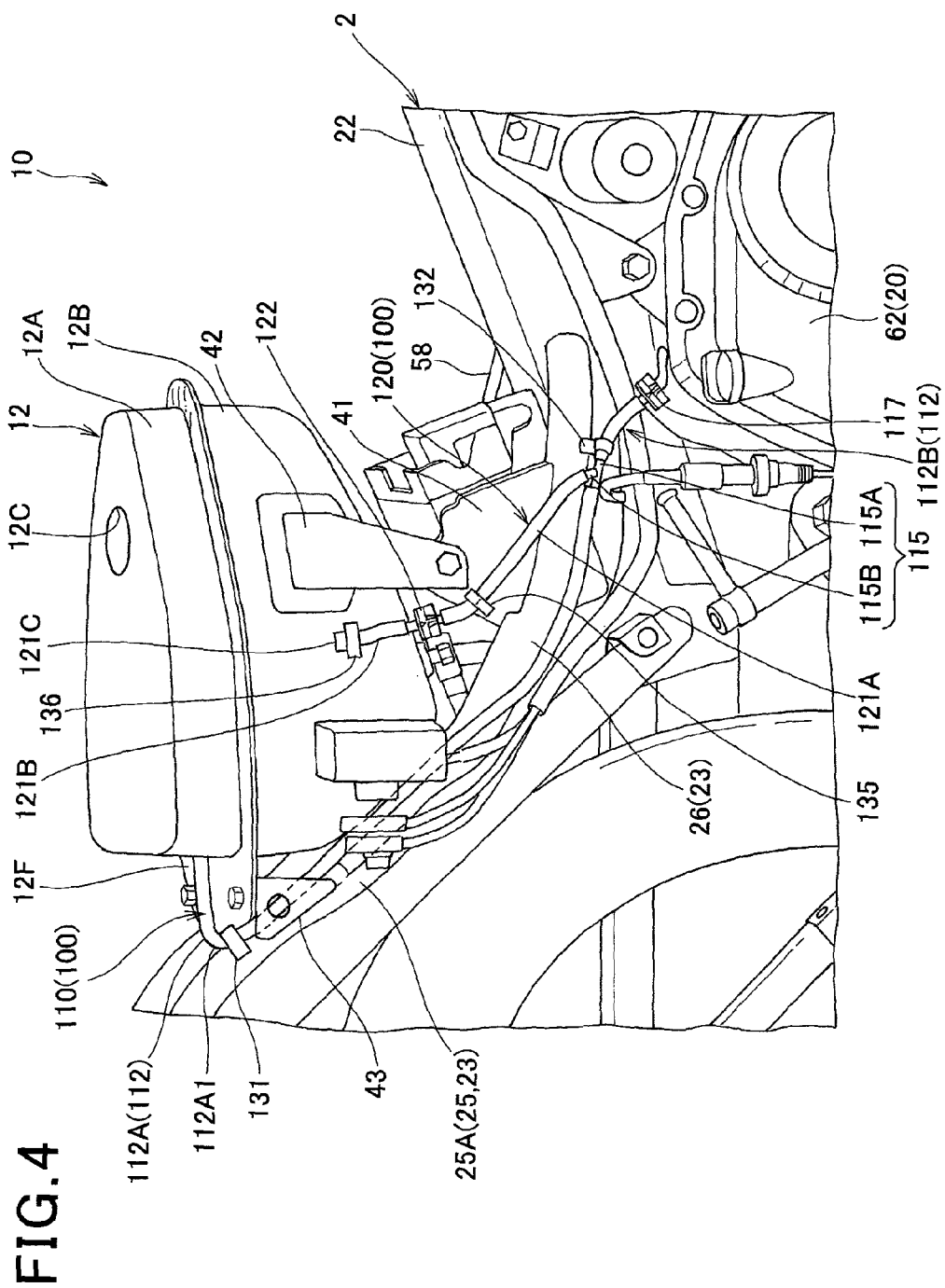
FIG. 4 is a view of the evaporated fuel control device together with the peripheral construction when they are viewed from the right side of the vehicle.
Figure 5:
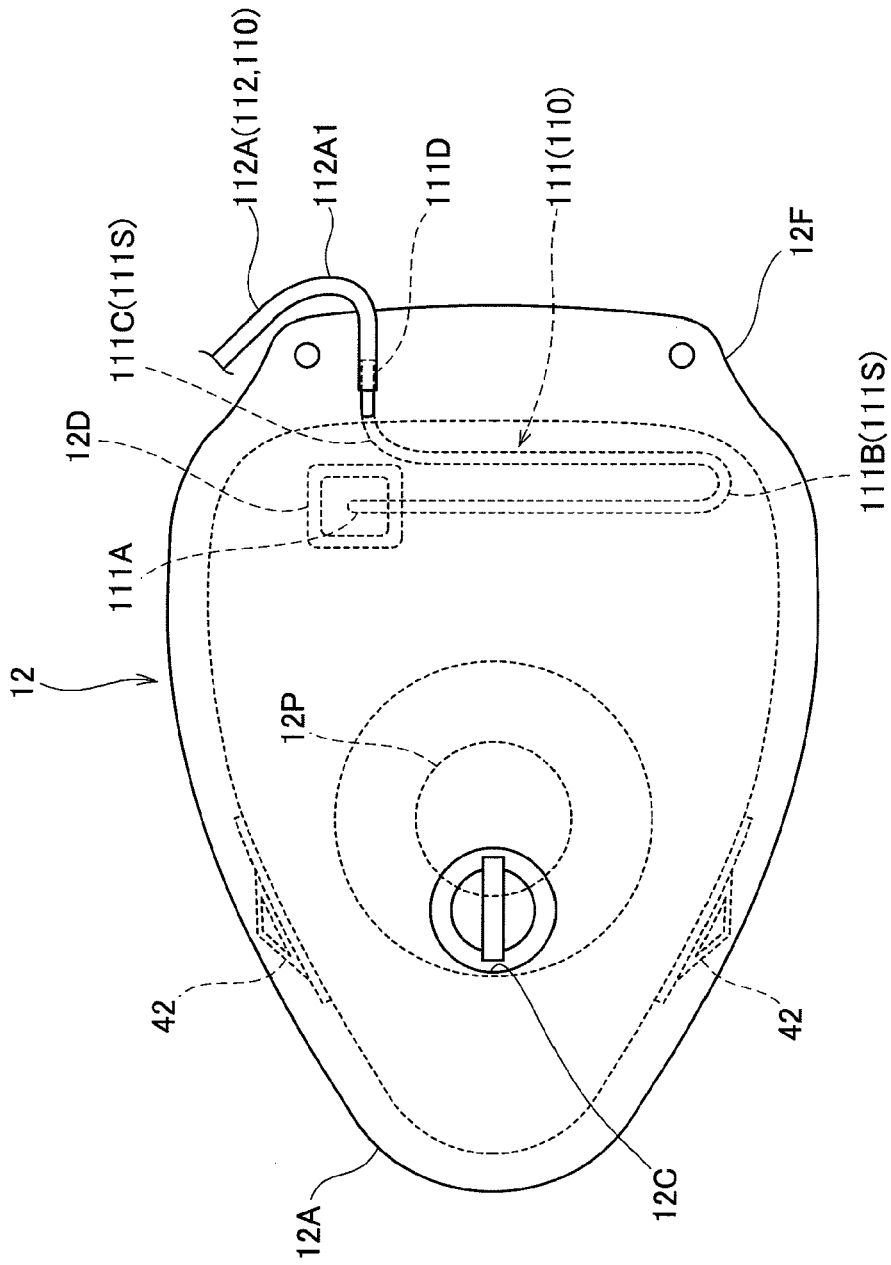
FIG. 5 is a view of a fuel tank when the fuel tank is viewed from the upper side.
Figure 6:
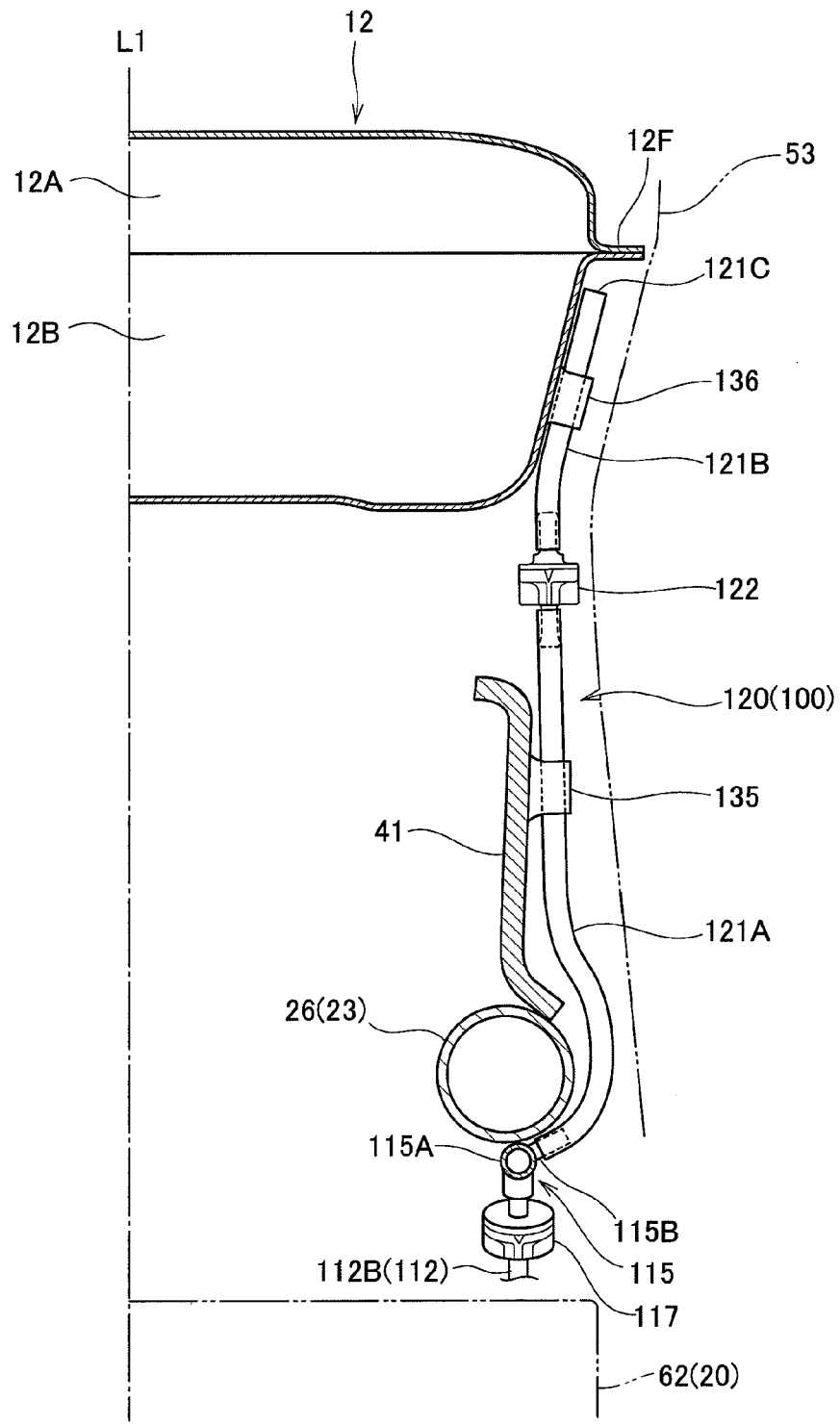
FIG. 6 is a side cross-sectional view of the fuel tank when the fuel tank is viewed from a rear side.

FIG. 4 is a view showing the evaporated fuel control device 100 together with the peripheral construction thereof when they are viewed from the right side of the vehicle body, FIG. 5 is a view of the fuel tank 12 when the fuel tank is viewed from the upper side, and FIG. 6 is a side cross-sectional view of the fuel tank 12 when the fuel tank 12 is viewed from the rear side. In FIG. 6, reference character L1 represents the center line of the vehicle body which passes through the center in the vehicle width direction.

As shown in FIG. 4, the evaporated fuel control device 100 has an evaporated fuel passage 110 which is connected to the fuel tank 12 at one end thereof and feeds evaporated fuel in the fuel tank 12 to engine oil in the engine (hereinafter referred to as oil), and an air supply passage 120 which is opened to the atmosphere at one end thereof and supplies outdoor air into the fuel tank 12.

The fuel tank 12 is configured in a vertically dual-partitioning structure so as to have an upper case 12A and a lower case 12B, and an oil supply port 12C and a gas-liquid separator 12D are disposed in the top plate of the upper case 12A so as to be spaced from each other at an interval in the front-and-rear direction as shown in FIG. 5. The fuel pump 12P is disposed below the oil supply port 12C, the fuel pump 12P and the gas-liquid separator 12D are disposed in the tank 12 to be apportioned in the front-and-rear direction.

The gas-liquid separator 12D is secured in the neighborhood of the rear wall of the back surface of the upper case 12A to be nearer to the other side (right wall) in the vehicle width direction. One end of an in-tank pipe 111 formed of metal or resin (containing rubber) which constitutes a part of the evaporated fuel passage 110 is joined to this gas-liquid separator 12D. One end of the in-tank pipe 111 is located at a higher position than the upper limit level of the fuel in the fuel tank 12.

The one end (in-tank end portion) 111A of the in-tank pipe 111 is joined to the gas-liquid separator 12D so as to face the right side of the vehicle body which is the other side in the vehicle width direction, and the in-tank pipe 111 extends therefrom to the neighborhood of the tank side wall (left wall) in the direction to one side (left side) in the vehicle width direction. Thereafter, the in-tank pipe 111 is folded back so as to form a curved portion 111B convexed to the one side in the vehicle width direction and extends to the neighborhood of the tank side wall (right wall) in the direction to the other side (right side) in the vehicle width direction. Furthermore, the in-tank pipe 111 is curved rearwards therefrom so as to form a curved portion 111C convexed to the other side (right side) in the vehicle width direction, and penetrates through the rear wall of the fuel tank 12 so that the other end (out-of-tank end portion) 111D is opened to the back side.

That is, an S-shaped pipe portion 111S which is bent in S-shape between the right and left sides in the vehicle width direction is formed in the in-tank pipe 111 by the pair of curved portions 111B and 111C. Therefore, even when the two-wheeled motor vehicle 10 is tilted to any one of the right and left sides in the vehicle width direction and thus liquid fuel in the fuel tank 12 flows into the in-tank pipe 111, the liquid fuel hardly flows through the S-shaped pipe portion 111, and the liquid fuel can be easily returned into the fuel tank 12 when the two-wheeled motor vehicle 10 is returned from the tilt.

The out-of-tank pipe 112 which constitutes the remaining part of the evaporated fuel passage 110 is joined to the out-of-tank end portion 111D. The out-of-tank pipe 112 is a flexible pipe having flexibility such as a rubber hose or the like, and it is formed of a pipe through which fuel does not permeable.

This out-of-tank pipe 112 protrudes rearwards from the out-of-tank end portion 111D of the in-tank pipe 111, curves so as to form a curved portion 112A1 which faces the other side (right side) in the vehicle width direction and the front side and extends frontwards along the rear frame 23 at the other side (right side) in the vehicle width direction. The out-of-tank pipe 112 extends to be tilted downwardly along the rear frame 23, and the lower end thereof is joined to the rear upper portion of the crank case 62 of the engine 20.

This out-of-tank pipe 112 has a first out-of-tank pipe 112A joined to the out-of-tank end portion 111D of the in-tank pipe 111, and a second out-of-tank pipe 112B joined to the first out-of-tank pipe 112A through a joint part 115, and it is supported along the rear frame 23 by a pair of front and rear clamp members 131, 132 which are provided to the rear frame 23 at the other side (right side) in the vehicle width direction so as to be spaced from each other at an interval.

Here, the pair of clamp members 131, 132 are pipe holding parts which are secured to the vehicle body 2 by welding or fastening members such as screws or the like to hold the out-of-tank pipe 112 on the vehicle body frame 2.

The first out-of-tank pipe 112A is clamped to the upper surface of the first rear frame 25 by the single clamp member 131 provided in the neighborhood of the rear wall of the fuel tank 12 so as to keep the rearwards convexed curved portion 112A1 described above. By drawing out rearwards the first out-of-tank pipe 112A from the rear wall of the fuel tank 12 as described above, the dead space between the rear wall of the fuel tank 12 and the first rear frame 25 can be effectively used as a pipe space, and also the out-of-tank pipe 112 can be drawn out to a tank near position at which the first rear frame 25 is proximate to the fuel tank 12, so that the out-of-tank pipe 112 can be easily laid along the rear frame 23.

The first out-of-tank pipe 112A extends from the upper surface of the slope portion 25A of the first rear frame 25 to the second rear frame 26 with being downwardly tilted, and passes over the outside in the vehicle width direction of the second rear frame 26 in the neighborhood of the joint portion between the first rear frame 25 and the second rear frame 26. The first out-of-tank pipe 112A is further drawn to the lower surface of the second rear frame 26 with being downwardly tilted, extends forwards along the lower surface of the second rear frame 26 with being downwardly tilted, and joined to the joint part 115 supported on the lower surface of the second rear frame 26.

As the joint part 115 is used a 3-way joint having a first pipe portion 115A which extends linearly and is connectable to pipes at both the ends thereof, and a second pipe portion 115B extending from an intermediate position of the first pipe portion 115A perpendicularly to the first pipe portion 115A, the first pipe portion 115A and the second pipe portion 115B being integrally with each other. The first out-of-tank pipe 112A is joined to one end side of the first pipe portion 115A, and the second out-of-tank pipe 112B is joined to the other end side thereof. Furthermore, one end of the air supply passage 120 is connected to the second pipe portion 115B.

The remaining clamp member 132 supporting the out-of-tank pipe 112 supports the neighboring position to the joint part 115 in the second out-of-tank pipe 112B at the lower surface of the second rear frame 26. Accordingly, the joint part 115 is also held along the lower surface of the second rear frame 26.

In this case, as shown in FIGS. 4 and 6, the joint part 115 is held so that the first pipe portion 115A extends in the front-and-rear direction along the lower surface of the second rear frame 26, and the second pipe portion 115B extends obliquely upwardly along the lower surface of the outside in the vehicle width direction of the second rear frame 26.

The second out-of-tank pipe 112B extends obliquely downwardly from the other end side of the first pipe portion 115A of the joint part 115 along the second rear frame 26, and is joined to the rear end portion of the engine 20 so as to intercommunicate with oil stocked in the oil pan in the crank case 62.

Here, FIG. 3 shows the upper limit oil level of oil stocked in the crank case 62, and reference numeral 20X represents the evaporated fuel passage in the engine 20 which is joined to the second out-of-tank pipe 112B and extends downwardly at the rear wall side in the crank case 62.

Reference character HL represents the upper limit oil level of oil stocked in the oil pan under the state that the two-wheeled motor vehicle 10 is parked on the horizontal surface, character reference LL represents the lower limit oil level of oil under the state that the two-wheeled motor vehicle 10 is parked on the horizontal surface, and reference character LL2 represents an oil level when the two-wheeled motor vehicle 10 is tilted to a park limit position on a downward slope after oil is put till the lower limit oil level LL under the state that the two-wheeled motor vehicle 10 is parked on the horizontal surface. The lower end opening 20Y of the evaporated fuel passage 20X is provided below and in the neighborhood of the oil level (the oil level under park limit) LL2. Accordingly, the lower end opening 20Y can be surely located within the oil without disposing the lower end opening 20Y at a needlessly low position, and the evaporated fuel which flows from the evaporated fuel passage 20X into the engine 20 is enabled to easily blend into the oil.

As described above, the out-of-tank pipe 112 is held by only the two clamp members 131 and 132 so as to serve as a descending pipe extending along the first rear frame 25 and further along the second rear frame 26, and the descending pipe is joined to the engine 20 disposed below the second rear frame 26 with being held. In addition, the whole out-of-tank pipe 112 can be easily viewed from the outside of the vehicle body, and it can be easily detached and attached.

As shown in FIG. 4, a first check valve 117 for stopping flow of the fluid from the engine 20 to the fuel tank 12 is interposed at some midpoint of the second out-of-tank pipe 112B. Accordingly, the evaporated fuel can be allowed to flow from the inside of the fuel tank 12 through the second out-of-tank pipe 112B into the engine 20, and also flow of the oil from the inside of the engine 20 to the fuel tank 12 can be prohibited in the neighborhood of the engine 20. Furthermore, since the first check valve 117 is provided in the neighborhood of the clamp member 132 (see FIG. 4), the first check valve 117 can be held by the clamp member 132, and it is unnecessary to provide a support member dedicated to the first check valve 117.

Furthermore, the first check valve 117 is supported by the second out-of-tank pipe 112B with being floated. Therefore, vibration of the engine 20 hardly transmits, and a special vibration-proof structure or the like is unnecessary.

As shown in FIG. 6, the air supply passage 120 has a first air supply passage 121A extending upwards from the second pipe portion 115B of the joint part 115, and a second air supply passage 121B joined to the first air supply passage 121A through a second check valve 122. The air supply passage 120 extends upwards from the second pipe portion 115B of the joint part 115, and the upper end (ambient air open end) 121C thereof is opened to a side (the right side) of the fuel tank 12 to intercommunicate with the atmosphere.

Specifically, the first and second air supply passages 121A and 121B are formed of flexible pipes having flexibility such as rubber hoses or the like. As shown in FIG. 6, the first air supply passage 121A passes from the second pipe portion 115B of the joint part 115 over the outside in the vehicle width direction of the second rear frame 26, passes over the outside in the vehicle width direction of the tank support bracket 41, and is supported by a single clamp member 135 provided to the tank support bracket 41. Accordingly, as shown in FIG. 4, the first air supply passage 121A extends from the joint part 115 to the upper rear side, and the upper portion thereof is held between the tank support bracket 41, the downwards extending stay 42 and the second rear frame 26.

The lower end of the second check valve 122 is joined to the upper end of the first air supply passage 121A, and the lower end of the second air supply passage 121B is joined to the upper end of the second check valve 122. The second check valve 122 is a check valve for stopping flow from the fuel tank 12 to the outside air. The second air supply passage 121B is formed to be shorter than the first air supply passage 121A, and supported by a single clamp member 137 provided to the side wall of the fuel tank 12 with being placed face up.

In this case, as shown in FIG. 6, the upper end (ambient air open end) 121C of the second air supply passage 121B is located below a flange portion 12F extending around the joint portion between the upper case 12A and the lower case 12B of the fuel tank 12. Therefore, intrusion of dust from the upper side can be prevented by the flange portion 12F, and also the air supply passage 120 can be disposed by using a narrow gap (dead space) between the flange portion 12F and a rear side cover 53 which is disposed proximately to the side of the fuel tank 12.

Furthermore, since the second check valve 122 is located between the pair of upper and lower clamp members 135 and 136 for supporting the air supply passage 120, the second check valve 122 is also positioned by the clamp members 135 and 136. In this case, the second check valve 122 is positioned between the fuel tank 12 and the tank support portion bracket 41, and the gap (dead space) between these parts can be used as a layout space for the second check valve 122, so that the sideward protrusion of the second check valve 122 can be suppressed.

Still furthermore, the second check valve 122 is supported by the second air supply passage 121B with being floated, so that vibration of the engine 20 hardly transmits. Therefore, a special vibration-proof structure or the like is unnecessary.

Next, the flow of the evaporated fuel by the evaporated fuel control device will be described.

When a part of the fuel in the fuel tank 12 evaporates and the internal pressure of the fuel tank 12 increases to be higher than the outdoor air pressure (positive pressure), the evaporated fuel passes through the gas-liquid separator 12D, flows into the in-tank pipe 111, passes through the in-tank pipe 111 and enters the out-of-tank pipe 112. In this case, the first check valve 117 provided to the out-of-tank pipe 112 is set to an open state, so that the evaporated fuel flows through the out-of-tank pipe 112 and the joint part 115 into the oil in the engine 20, whereby the evaporated fuel can be made to blend into the oil.

On the other hand, when the internal pressure of the fuel tank 12 decreases to be less than the outdoor air temperature (negative pressure), the second check valve 122 provided to the air supply passage 120 is set to an open state, so that the outdoor air intrudes from the outdoor air open end 121C into the air supply passage 120, successively flows through the air supply passage 120, the joint part 115 and a part of the evaporated fuel passage 110 (the first out-of-tank pipe 112A and the in-tank pipe 111) in this order, and flows into the fuel tank 12, whereby the internal pressure of the fuel tank 12 can be adjusted to the atmosphere pressure.

As shown in FIG. 2, the two-wheeled motor vehicle 10 is provided with a return passage 141 for connecting a head cover 610 of the engine 20 and an air cleaner unit 72.

This return passage 141 is formed in the head cover 61C. A valve driving chamber intercommunicating with the inside of the crank case 62 and the inside of the air cleaner unit 72 (air cleaning chamber) are made to intercommunicate with each other through the return passage 141. Accordingly, evaporated fuel occurring in the crank case 62 (evaporated fuel generated when the fuel blending in the oil is evaporated, and blow-by gas) is supplied through the air cleaner unit 72 to the engine intake system, whereby the two-wheeled motor vehicle 10 is configured so that the evaporated fuel in the crank case 62 is not discharged to the atmosphere.

Figure 7:
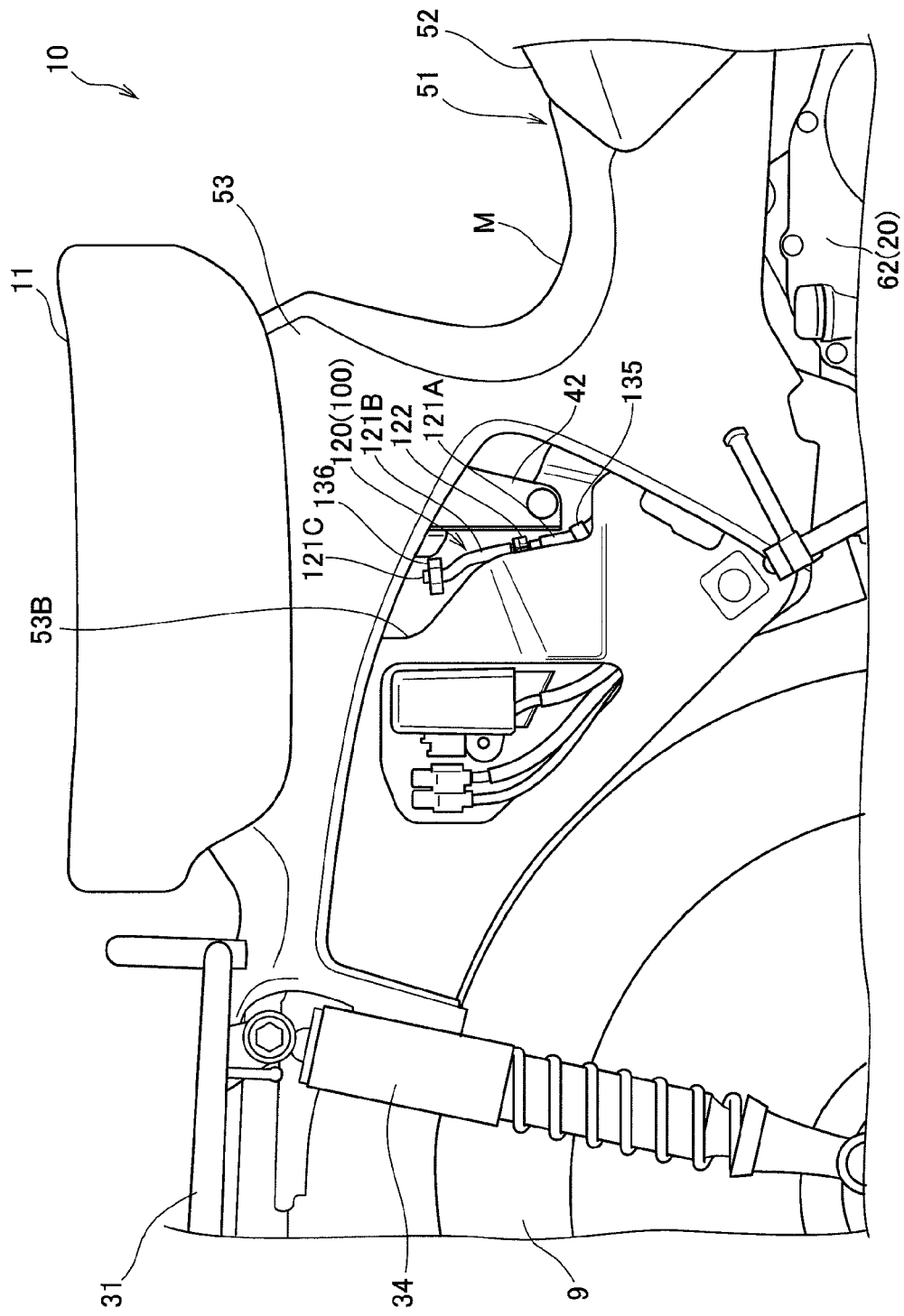
FIG. 7 is a diagram showing a state that a lid at the right side of the vehicle is detached.

FIG. 7 shows a state that the lid 53A provided to the rear side cover 53 at the right side of the vehicle body is detached. As shown in FIG. 7, when the lid 53A is detached, a part of the evaporated fuel control device 100 is exposed from the opening portion 53B provided to the rear side cover 53, whereby it is possible to access the evaporated fuel control device 100. In this construction, the portion (the air supply passage 120) provided to the side wall of the fuel tank 12 is exposed as shown in FIG. 7. Therefore, various kinds of maintenance such as status check and cleaning of the outdoor air open end 121C and the second air supply passage 121B can be performed.

As described above, according to this embodiment, in the vehicle layout in which the fuel tank 12 is located at a higher position than the engine 20, the evaporated fuel passage 110 is routed as a descending passage from the fuel tank 12 to the engine 20, and the air supply passage 120 is joined to a halfway position of the evaporated fuel passage 110 which is located at the fuel tank 12 side with respect to the first check valve 117 and positionally lower than the uppermost portion of the fuel tank 12, so that the air supply passage 120 can be laid out without being disposed at a higher position than the fuel tank 12.

Under this layout, a part of the evaporated fuel passage 110 (the first out-of-tank pipe 112A and the in-tank pipe 111), that is, a part of the evaporated fuel passage 110 which is located at the fuel tank 12 side with respect to the joint portion (corresponding to the joint part 115) to which the air supply passage 120 is joined also serves as the air supply passage 120, so that the air supply passage 120 can be shortened.

Furthermore, even when liquid fuel flows from the fuel tank 12 into the evaporated fuel passage 110, the liquid fuel more easily flows to the engine 20 side as compared with the joint portion (joint part 115) of the air supply passage 120 because the evaporated fuel passage 110 serves as a descending passage. Therefore, the air supply passage 120 and the part of the evaporated fuel passage 110 which also serves as the air supply passage 120 are easily kept under the state that they intercommunicate with each other, so that the inside of the fuel tank 12 can be adjusted to the atmosphere pressure.

As described above, according to this construction, the air supply passage 120 is laid out without being disposed at a higher position than the fuel tank 12. Therefore, even when a seat layout is set so that the seat 11 on which a driver sits covers the upper surface of the fuel tank 12, it is unnecessary to secure the space for the air supply passage 120 between the seat 11 and the fuel tank 12. Therefore, the seat can be set at a low position as in the case of a vehicle having no evaporated fuel control device 100.

Furthermore, in this construction, after the evaporated fuel passage protrudes rearwards from the fuel tank 12, it is disposed along the rear frame 23 at the right side and connected to the engine 20. Therefore, the evaporated fuel passage 110 can be routed by using the rear frame 23.

In addition, in this construction, the fuel supply passage 58 for supplying fuel from the fuel tank 12 to the engine intake system is disposed along the rear frame 23 at the left side. Therefore, the fuel supply passage 58 and the evaporated fuel passage 110 are disposed to be allocated to the right and left sides, so that they can be easily assembled.

Furthermore, in this construction, the air supply passage 120 is routed at the same side as the evaporated fuel passage 110 in the vehicle width direction. Therefore, the air supply passage 120 can be assembled from the same side, so that the attaching/detaching performance and maintenance performance of the whole evaporated fuel control device 100 can be enhanced.

In this construction, the air supply passage 120 extends upwards from the rear frame 23 and extends upwards along the tank support bracket 41 for supporting the fuel tank 12, and also the air supply passage 120 is clamped and supported by the tank support bracket 41 and the fuel tank 12. Therefore, the air supply passage 120 can be supported by using an existing part, so that increase of the number of parts can be avoided.

Furthermore, the second check valve 122 is disposed between the tank support bracket 41 and the fuel tank 12, and the air supply passage 120 is supported on the fuel tank 12 at an open end side thereof with respect to the second check valve 122 of the air supply passage 120. Therefore, the second check valve 122 can be disposed by using the dead space between the tank support bracket 41 and the fuel tank 12, and the outdoor air open end 121C of the air supply passage 120 can be surely positioned on the side surface of the fuel tank 12 so that the air supply passage 120 can be opened to the atmosphere.

Still furthermore, in this construction, the fuel tank 12 is located at a substantially middle position between the front wheel 7 and the rear wheel 9 in the vehicle travel direction. Therefore, the fuel tank 12 and the outdoor air open end 121C of the air supply passage 120 can be disposed to be far away from the front and rear wheels at which dust is easily raised, and also to be relatively distant from the ground surface.

Furthermore, the first check valve 117 is disposed at the upper side of the crank case 62 which is positionally overlapped with the engine 20 in top view (see FIG. 6). Therefore, when oil from the engine 20 exists in the first check valve 117, the fluidity of the oil is increased by heat ascending from the engine 20 to enable the oil from easily return to the engine 20 side. When liquid fuel exists in the first check valve 117, the liquid fuel can be positively evaporated by the heat of the engine 20.

The embodiment described above is merely an example of the present invention, and any modification and application may be made without departing from the subject matter of the present invention. For example, in the above embodiment, the evaporated fuel control device 100 is disposed at the right side of the vehicle body, and the fuel supply passage 58 is disposed at the left side of the vehicle body. However, the present invention is not limited to this style, and they may be disposed while right and left are reversed. Furthermore, in the above embodiment, the evaporated fuel passage 110 is disposed along the second rear frame 26 at any one of the right and left sides, and the fuel supply passage 58 is disposed along the second rear frame 26 at the other side. In short, they may be disposed along the rear frame 23, and they may be disposed along the first rear frames 25.

Furthermore, in the above embodiment, the air supply passage 120 is clamped and supported by the tank support bracket 41 and the fuel tank 12. However, the air supply passage 120 may be supported by any one of the tank support bracket 41 and the fuel tank 12.

Still furthermore, in the above embodiment, the present invention is applied to the evaporated fuel control device 100 of the two-wheeled motor vehicle 10 shown in FIG. 1. However, the present invention is not limited to this style, and the present invention may be applied to an evaporated fuel control device of another saddle-type vehicle. The saddle-type vehicles contain all types of vehicles in which a rider gets on a vehicle while straddling the vehicle body, and they contain not only two-wheeled motor vehicles (containing scooter type vehicles), but also three-wheeled vehicles and four-wheeled vehicles which are classified as ATV (All-Terrain Vehicle).

DESCRIPTION OF REFERENCE NUMERALS 2 vehicle body frame
3 head pipe
7 front wheel
9 rear wheel
10 two-wheeled motor vehicle (saddle-type vehicle)
11 seat
12 fuel tank
20 engine
22 main frame
23 rear frame
41 tank support bracket
100 evaporated fuel control device
110 evaporated fuel passage
117 first check valve
120 air supply passage
121C outdoor air open end
122 second check valve

The invention claimed is:

1. An evaporated fuel control device for a saddle-type vehicle having an engine, a fuel tank for stocking fuel, an evaporated fuel passage that is connected to the fuel tank at one end thereof and connected to oil in the engine at the other end thereof, a first check valve that is provided in the evaporated fuel passage and stops flow from the engine to the fuel tank, an air supply passage for supplying outdoor air into the fuel tank, and a second check valve that is provided in the air supply passage and stops flow from the fuel tank to the atmosphere, wherein the fuel tank is disposed at an upper side of the engine, the evaporated fuel passage is routed as a descending path from the fuel tank to the engine, the air supply passage is joined to the evaporated fuel passage that is located at a fuel tank side above the first check valve and positionally lower than the uppermost portion of the fuel tank.

2. The evaporated fuel control device for the saddle-type vehicle according to claim 1, wherein the saddle-type vehicle has a head pipe for supporting a front wheel so that the front wheel is steerable, and a main frame extending rearwards and downwards from the head pipe, the engine is disposed at a lower side of the main frame, the fuel tank is disposed at an upper side of a rear frame extending rearwards and upwards from a rear portion of the main frame, and the evaporated fuel passage protrudes rearwards from the fuel tank and is further disposed along the rear frame and connected to the engine.

3. The evaporated fuel control device for the saddle-type vehicle according to claim 2, wherein a pair of right and left rear frames are provided, the evaporated fuel passage is disposed along one rear frame of the pair of right and left rear frames, and a fuel supply passage for supplying fuel from the fuel tank to an intake system of the engine is disposed along the other rear frame.

4. The evaporated fuel control device for the saddle-type vehicle according to claim 2, wherein the rear frame is provided with a tank support bracket that extends upwards from the rear frame and supports the fuel tank, the air supply passage extends upwards along the tank support bracket, and a part of the air supply passage is supported by the tank support bracket or the fuel tank.

5. The evaporated fuel control device for the saddle-type vehicle according to claim 4, wherein the second check valve is disposed between the tank support bracket and the fuel tank, and a portion of the air supply passage that is located at an open end side thereof with respect to the second check valve is supported by the fuel tank.

6. The evaporated fuel control device for the saddle-type vehicle according to claim 4, wherein the fuel tank is disposed at a substantially middle position between the front wheel and a rear wheel in a vehicle travel direction.

7. The evaporated fuel control device for the saddle-type vehicle according to claim 2, wherein the saddle-type vehicle has a seat on which a driver sits, and the seat is disposed so as to cover an upper surface of the fuel tank.

8. The evaporated fuel control device for the saddle-type vehicle according to claim 1, wherein the first check valve is disposed to be positionally overlapped with the engine in top view.

9. The evaporated fuel control device for the saddle-type vehicle according to claim 3, wherein the rear frame is provided with a tank support bracket that extends upwards from the rear frame and supports the fuel tank, the air supply passage extends upwards along the tank support bracket, and a part of the air supply passage is supported by the tank support bracket or the fuel tank.

10. The evaporated fuel control device for the saddle-type vehicle according to claim 5, wherein the fuel tank is disposed at a substantially middle position between the front wheel and a rear wheel in a vehicle travel direction.

11. The evaporated fuel control device for the saddle-type vehicle according to claim 3, wherein the saddle-type vehicle has a seat on which a driver sits, and the seat is disposed so as to cover an upper surface of the fuel tank.

12. The evaporated fuel control device for the saddle-type vehicle according to claim 4, wherein the saddle-type vehicle has a seat on which a driver sits, and the seat is disposed so as to cover an upper surface of the fuel tank.

13. The evaporated fuel control device for the saddle-type vehicle according to claim 5, wherein the saddle-type vehicle has a seat on which a driver sits, and the seat is disposed so as to cover an upper surface of the fuel tank.

14. The evaporated fuel control device for the saddle-type vehicle according to claim 6, wherein the saddle-type vehicle has a seat on which a driver sits, and the seat is disposed so as to cover an upper surface of the fuel tank.

15. The evaporated fuel control device for the saddle-type vehicle according to claim 2, wherein the first check valve is disposed to be positionally overlapped with the engine in top view.

16. The evaporated fuel control device for the saddle-type vehicle according to claim 3, wherein the first check valve is disposed to be positionally overlapped with the engine in top view.

17. The evaporated fuel control device for the saddle-type vehicle according to claim 4, wherein the first check valve is disposed to be positionally overlapped with the engine in top view.

18. The evaporated fuel control device for the saddle-type vehicle according to claim 5, wherein the first check valve is disposed to be positionally overlapped with the engine in top view.

19. The evaporated fuel control device for the saddle-type vehicle according to claim 6, wherein the first check valve is disposed to be positionally overlapped with the engine in top view.

20. The evaporated fuel control device for the saddle-type vehicle according to claim 7, wherein the first check valve is disposed to be positionally overlapped with the engine in top view.

* * * * *